United States Patent [19]

Britzke et al.

[11] Patent Number: 4,611,434
[45] Date of Patent: Sep. 16, 1986

[54] SWINGABLE SLIDING DOOR FOR VEHICLES, PARTICULARLY AUTOMOTIVE VEHICLES

[75] Inventors: Ingo Britzke, Kassel; Hans Kramer, Baunatal, both of Fed. Rep. of Germany

[73] Assignee: Gebr. Bode & Co. GmbH, Kassel, Fed. Rep. of Germany

[21] Appl. No.: 690,770

[22] PCT Filed: May 12, 1984

[86] PCT No.: PCT/DE84/00107
§ 371 Date: Jan. 11, 1985
§ 102(e) Date: Jan. 11, 1985

[87] PCT Pub. No.: WO84/04500
PCT Pub. Date: Nov. 22, 1984

[51] Int. Cl.[4] .............................................. E05D 15/58
[52] U.S. Cl. ........................................ 49/257; 49/214; 49/218
[58] Field of Search ................. 49/257, 215, 213, 214, 49/218

[56] References Cited

U.S. PATENT DOCUMENTS

| 1,959,705 | 5/1934 | Christianson | 49/218 X |
| 3,100,667 | 8/1963 | Schwenk | 49/214 |
| 3,501,864 | 3/1970 | Erb et al. | 49/215 |
| 3,990,183 | 11/1976 | Meggs et al. | 49/257 X |
| 4,152,872 | 5/1979 | Tanizaki et al. | 49/215 X |

FOREIGN PATENT DOCUMENTS 1480612 2/1970 Fed. Rep. of Germany ........ 49/215

Primary Examiner—Philip C. Kannan
Attorney, Agent, or Firm—Roberts, Spiecens & Cohen

[57] ABSTRACT

A swingable sliding door for a vehicle, comprising a guide assembly on the top of the door traveling in a guide rail arranged above the door, the guide assembly comprising a swing arm pivotally attached to the door and including an arcuate, reversely bent portion connected rigidly to a roller assembly which travels in the guide rail. The bent portion of the swing arm straddles an end post of the door opening when the door is in open position to maximize the access opening when the door is fully opened.

7 Claims, 4 Drawing Figures

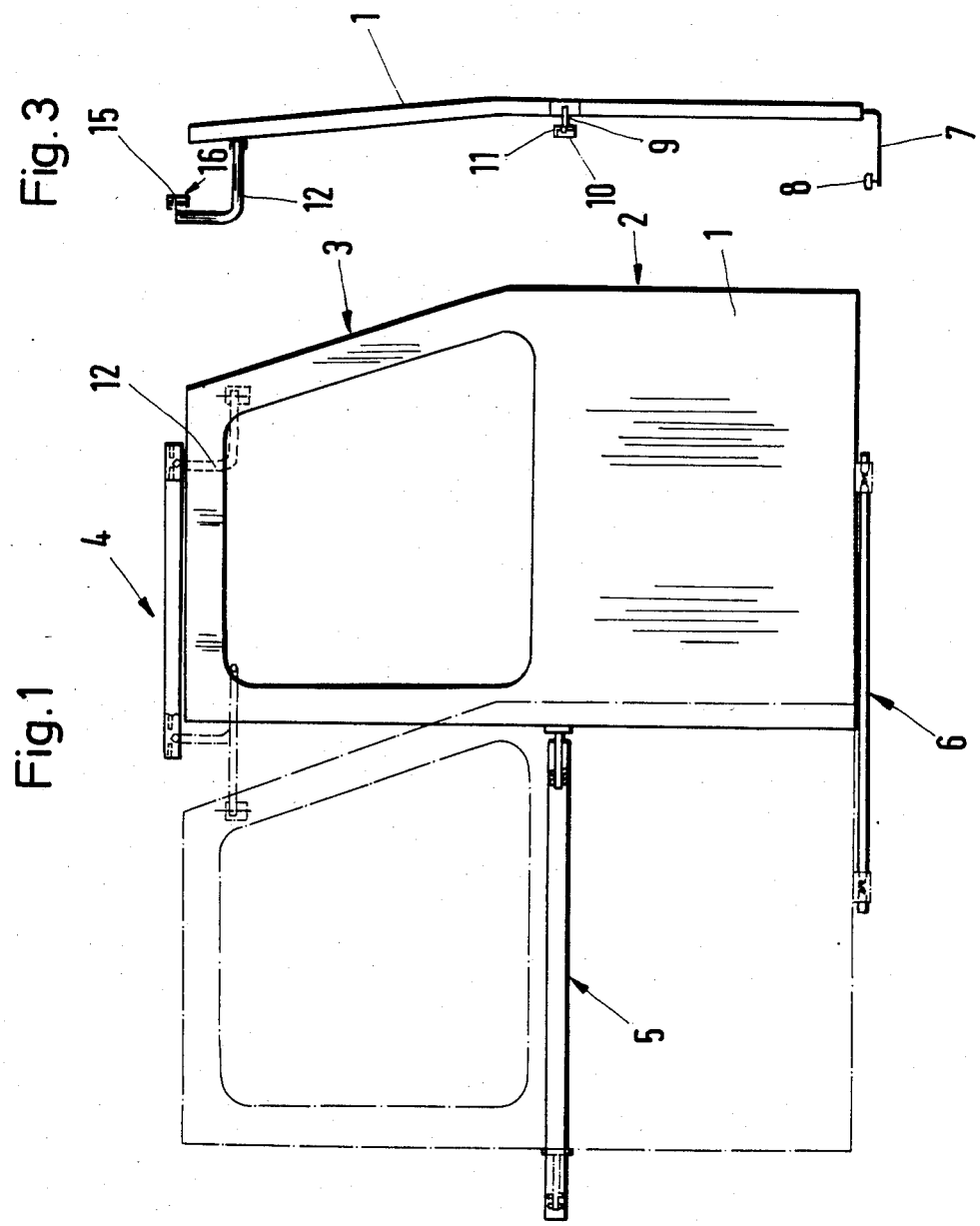

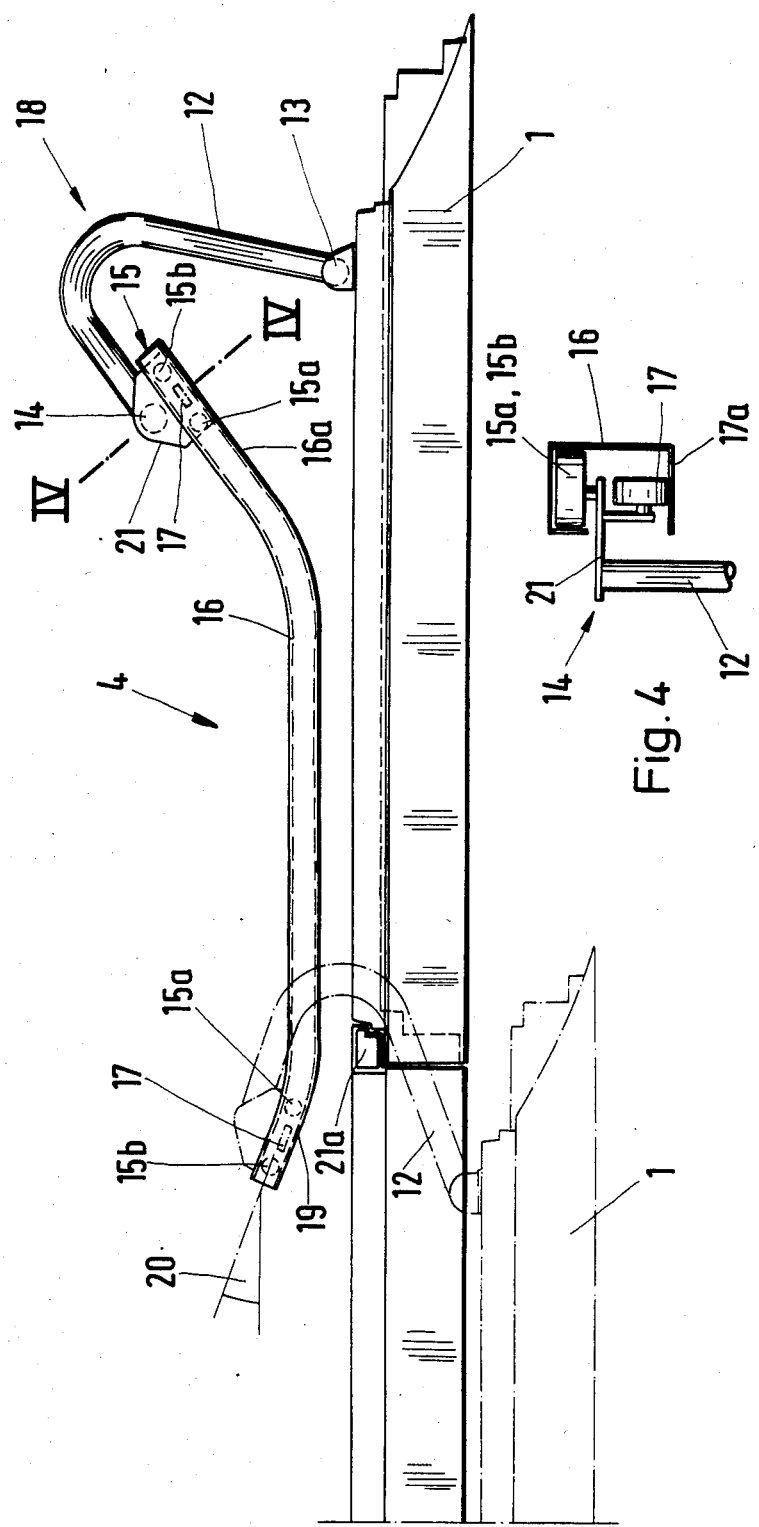

SWINGABLE SLIDING DOOR FOR VEHICLES, PARTICULARLY AUTOMOTIVE VEHICLES

FIELD OF THE INVENTION

The present invention relates to a swingable sliding door for a vehicle, particularly an automotive vehicle, in which guide means are mounted at the top of the door panel for travel in a guide rail secured above the door panel.

PRIOR ART

Swingable sliding doors for automotive vehicles are known, particularly doors for a driver's cab and in which an inwardly bent angle plate is mounted at the top of the door panel and supports a pair of horizontally spaced rollers which travel in respective guide rails which are bent at the end.

Since the lower portion of the door of a truck cab is widened as a result of the contour of the vehicle, while the upper pillar is rearwardly inclined, the central part of the door is disposed within the door opening when the door is opened. As a result, the available access width is limited.

SUMMARY OF THE INVENTION

An object of the present invention is to provide a swingable sliding door for a vehicle, particularly an automotive vehicle, in which substantially the entire width of the door opening is available for access when the door is in open position.

This is achieved, in accordance with the invention, in that the guide means mounted at the top of the door comprises a pivot arm which is pivotally mounted on the door and whose end is bent in arcuate shape and is rigidly connected to a roller assembly which travels in a guide rail. The bend or arcuate curvature of the pivot arm is more than 90° but less than 180°, and is preferably about 160°.

In order that the path of displacement of the swingable sliding door is enlarged still further, the end of the rail which corresponds to the open position of the door is bent slightly at an angle towards the inside of the body of the vehicle.

BRIEF DESCRIPTION OF THE FIGURES OF THE DRAWING

One embodiment of the invention is shown in the drawing, in which:

FIG. 1 diagrammatically shows the swingable sliding door in solid lines in its closed position and chain-dotted lines in its open position;

FIG. 2 is a top plan view, on enlarged scale, of the upper guide means for the door and wherein the door is shown in closed position in solid lines and in open position in chain-dotted lines;

FIG. 3 is a side elevational view of the door; and

FIG. 4 is a sectional view along line IV—IV in FIG. 2.

DETAILED DESCRIPTION OF THE PREFERRED EMBODIMENT

Seen in FIG. 1 is a swingable sliding door 1 which is shown in closed position in solid lines and in open position in chain-dotted lines. The door 1 has a lower portion 2 which is relatively wide and a narrower upper portion 3 whose front pillar is inclined rearwardly. The door 1 is guided at the top by a guide means 4; at the center by a guide means 5 and at the bottom by a guide means 6.

The guide means 5 and 6 are conventional. Guide means 6 comprises a rigid guide arm 7 which travels in a fixed, downwardly open, U-shaped rail 8. The guide means 5 comprises a swing arm 9 with a roller 10 at its end traveling in a corresponding fixed guide rail 11.

The upper guide means 4 is essential for the guidance of the door and is shown in detail in FIG. 2. As seen therein, the guide means 4 comprises swing arm 12 pivotally attached at one end to the door 1 at 13. The other end of the swing arm 12 rigidly supports a roller assembly 15 including rollers 15a, 15b, which travel in a rail 16. The rail is a downwardly open U-shaped rail in which the guide rollers 15a and 15b are confined. In addition, the roller assembly also comprises a support roller 17 which rotates around a horizontal axle and which travels on a corresponding flat rail 17a which can be attached to the downwardly open U-shaped rail 16 or made integral therewith. The guide rollers 15a, 15b and the support roller 17 form the roller assembly 15, which is rigidly attached by a plate 21 to the swing arm 12, as seen in FIGS. 2 and 4. By this construction of the roller assembly, the roller assembly, and thus the swing arm, are movable about the point of contact or application of the support roller 17 on the rail 17a.

The rail 16 is inclined inwardly at its end 16a and as a result, the door 1 can move into the door opening and lie flush with the wall or frame of the vehicle body in its closed position, as seen in solid lines in FIG. 2.

In order for substantially the entire width of the door opening to be exposed in the open position of the door 1, the swing arm 12 is formed with a reversely bent or arcuate portion 18. The degree of bend of the arcuate portion is greater than 90° but less than 180°, and is preferably about 160°.

In order for the door 1, in the open position, to carry out a still somewhat larger path of displacement, the end portion 19 of the rail 16, and therefore the part of the rail 16 which corresponds to the open position of the door, is inclined slightly inwards. This degree of inclination, as shown at 20 in FIG. 2, is about 10°.

As shown in FIG. 2, as a result of the bent portion 18 of the swing arm 12, the door post 21a is straddled, as shown in chain-dotted outline in FIG. 2, with the result that in the open position of the door substantially the entire width of the door opening is accessible.

More particularly, the bend in the arm 12 permits the door 1 to be moved to the left in FIG. 1 to its open position in which the wider portion of the door is approximately at the rear frame of the door and thereby the door opening will be fully accessible. In contrast, with conventional constructions of the upper guide means, the upper end of the door would lie at the rear of the door opening and the wider portion of the door would intrude into and block part of the door opening.

Although the invention has been described in relation to a specific embodiment thereof, it will become apparent to those skilled in the art that numerous modifications and variations thereof can be made without departing from the scope and spirit of the invention as defined in the attached claims.

What is claimed is:

1. A swingable sliding door apparatus for a vehicle comprising a door having an upper end portion, a fixed guide rail adjacent said upper end portion of said door and guide means connected to said upper end portion of said door and engaged in said guide rail for guiding the movement of the door in traveling between open and closed positions thereof, an end post against which said door abuts in the closed position, said guide means comprising a swing arm having one end pivotably attached to said door and a remote end, a roller assembly rigidly connected to said remote end and rollably supported in said fixed rail, said swing arm including a bent portion between said ends to straddle said post in said open position for maximizing the access opening when the door is in open position.

2. A door apparatus as claimed in claim 1 wherein said bent portion is reversely bent through an angle between 90° and 180°.

3. A door apparatus as claimed in claim 2 wherein said angle is 160°.

4. A door apparatus as claimed in claim 1 wherein said rail includes an end portion which receives said roller assembly in the open position of the door, said end portion being inclined with respect to said rail in a direction away from said door.

5. A door apparatus as claimed in claim 1 wherein said bent portion forms an arcuate bend in said swing arm.

6. A door apparatus as claimed in claim 1 wherein said roller assembly comprises a horizontal roller with a vertical axis of rotation and a vertical roller with a horizontal axis of rotation, said vertical roller rollably resting on said rail at a contact surface around which said roller assembly turns as the door is opened and closed.

7. A door apparatus as claimed in claim 1 wherein said rail includes an end portion which receives said roller assembly in the closed position of the door, said end portion being inclined with respect to said rail in a direction away from said door.

* * * * *